United States Patent [19]

Horii et al.

[11] Patent Number: 4,794,807
[45] Date of Patent: Jan. 3, 1989

[54] TRACTOR TRANSMISSION

[75] Inventors: Yasuyuki Horii; Takashi Yoshii, both of Sakai, Japan

[73] Assignee: Kubota, Ltd., Osaka, Japan

[21] Appl. No.: 27,905

[22] Filed: Mar. 19, 1987

[30] Foreign Application Priority Data

Jun. 12, 1986 [JP] Japan ................ 61-137150
Jul. 11, 1986 [JP] Japan ................ 61-163982
Jul. 11, 1986 [JP] Japan ................ 61-163984

[51] Int. Cl.⁴ .................. B60K 17/28; B60K 25/00
[52] U.S. Cl. .................... 74/15.84; 74/15.66; 74/15.8
[58] Field of Search ........... 74/15.4, 15.66, 15.8, 74/15.84; 180/53.4, 53.7

[56] References Cited

U.S. PATENT DOCUMENTS

| | | | |
|---|---|---|---|
| 2,680,377 | 6/1954 | Gerst | 74/15.84 |
| 3,049,930 | 8/1962 | Porsche et al. | 74/15.84 |
| 3,147,643 | 9/1964 | Christenson et al. | 74/15.66 |
| 3,893,345 | 7/1975 | Sisson et al. | 74/15.66 |
| 4,405,038 | 9/1983 | Ternehäll | 74/15.84 |

FOREIGN PATENT DOCUMENTS 0558123 5/1977 U.S.S.R. ................ 74/15.66

Primary Examiner—Lawrence Staab
Assistant Examiner—Scott Anchell
Attorney, Agent, or Firm—Edwin E. Greigg

[57] ABSTRACT

A transmission for a tractor comprising a propelling line for transmitting an engine output to drive wheels, and a power takeoff line for transmitting the engine output to a working implement attached to the tractor. The transmission further comprises a torque converter including a casing connected to an engine output shaft and an input shaft of the propelling line, and a turbine liner and a lockup clutch connected to an input shaft of the power takeoff line. The propelling line includes a first hydraulic clutch for transmitting the engine output in forward rotation and a second hydraulic clutch for transmitting the engine output in backward rotation, engine output transmission through the propelling line being broken when the first and second hydraulic clutches are disengaged. The power takeoff line includes a power takeoff hydraulic clutch, and a power takeoff gear disposed upstream of the hydraulic clutch for driving hydraulic pumps attached to a transmission case.

7 Claims, 6 Drawing Sheets

TRACTOR TRANSMISSION

BACKGROUND OF THE INVENTION

(1) Field of the Invention

The present invention relates to a transmission for a tractor and particularly to a power takeoff line in the transmission for transmitting an engine output to a working implement attached to the tractor.

(2) Description of the Prior Art

Drive transmission to a working implement such as a rotary plow attached to the tractor is disclosed, for example, in U.S. Pat. No. 4,565,102. As in this patent, the engine output generally is transmitted to the working implement through a main clutch and a power takeoff clutch. However, when the tractor engages in a plowing operation for example, the power takeoff line having the above construction allows an overload to fall on the engine suddenly when the working implement encounters a very hard soil or when its plowing depth suddenly increases for some reason. In the worst case such an overload may result in an engine failure. In order to avoid such an inconvenience, a proposal has been made in the Japanese utility model application laid open under No. 55-41695 in which the power takeoff line includes a safety clutch for automatically breaking drive transmission when a torque exceeding a predetermined value takes place. However, although the proposed constuction is capable of avoiding the engine failure in spite of the excessive torque, the rotary plow is caused to stop temporarily and leave an unplowed patch in the field.

SUMMARY OF THE INVENTION

An object of the present invention is to provide a transmission for a tractor comprising a power takeoff line that permits both the engine and the working implement attached to the tractor to keep running even when a great load acts on the working implement.

In order to achieve this object, a transmission for a tractor according to the invention comprises a propelling line for transmitting an engine output to drive wheels, and a power takeoff line for transmitting the engine output through a torque converter to a working implement attached to the tractor.

The torque converter transmits the drive by means of pressure oil. Therefore, even when an overload acts on the working implement attached to the tractor and its rate of revolution drops suddenly, the slipping action due to the pressure oil of the torque converter prevents the sudden drop in the rate of revolution from directly affecting the engine. Thus there hardly is any possibility of engine failure resulting from the load acting on the working implement. Furthermore, the torque converter has such a characteristic that its torque transmission increases with a drop in the rate of revolution of the transmission line downstream or at an output side thereof, namely the transmission line leading from the torque converter to the working implement. Therefore, even when great variations take place in the load acting on the working implement, a good operation accommodating such variations may be continued without an engine failure. The tractor now has an improved working efficiency, being capable of a smooth and continuous operation without the engine running constantly in spite of the variations in the load acting on the working implement.

In a preferred embodiment of the present invention, the torque converter is connected to an input shaft of the power takeoff line and the power takeoff line includes a power takeoff gear between the torque converter and a power takeoff hydraulic clutch for driving hydraulic pumps. In conventional practice the hydraulic pumps are often driven by the camshaft of the engine. Since the present invention employs the torque converter for the power takeoff line, there is little possibility of stoppage occurring with the portion of the power takeoff line upstream of the power takeoff hydraulic clutch. Accordingly, the power takeoff gear is provided in this region with the result that the hydraulic pumps are attached to a transmission case. In this construction the hydraulic pumps utilize oil in the transmission case as pressure oil. Therefore, the pumps have a short intake passage which presents only a small suction resistance.

Other features and advantages of the invention will be apparent from the detailed description of the preferred embodiment to follow.

DESCRIPTION OF THE PREFERRED EMBODIMENT

An agricultural tractor embodying the present invention will be described hereinafter with reference to the drawings.

Figure 1:
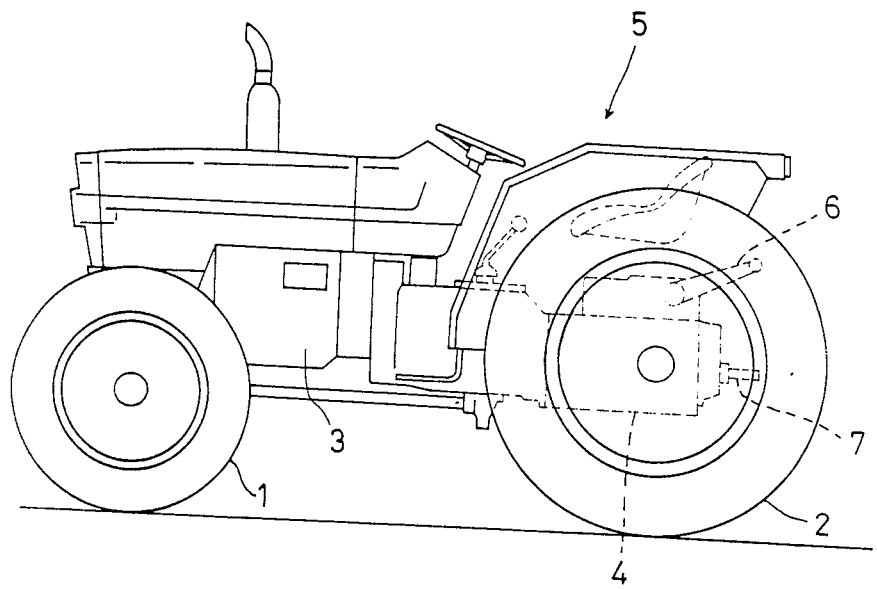
FIG. 1 is a side elevation of a tractor having a transmission according to the present invention.

As shown in FIG. 1, the tractor comprises a chassis supported by front wheels 1 and rear wheels 2. The chassis carries an engine 3 and a transmission case 4 directly connected to each other. The tractor further comprises a driver's section 5, a lift arm 6 for connection to a working implement (not shown) for raising and lowering the same, and a power takeoff shaft 7 projecting from a rear end of the transmission case 4 for driving the working implement.

Figure 2:
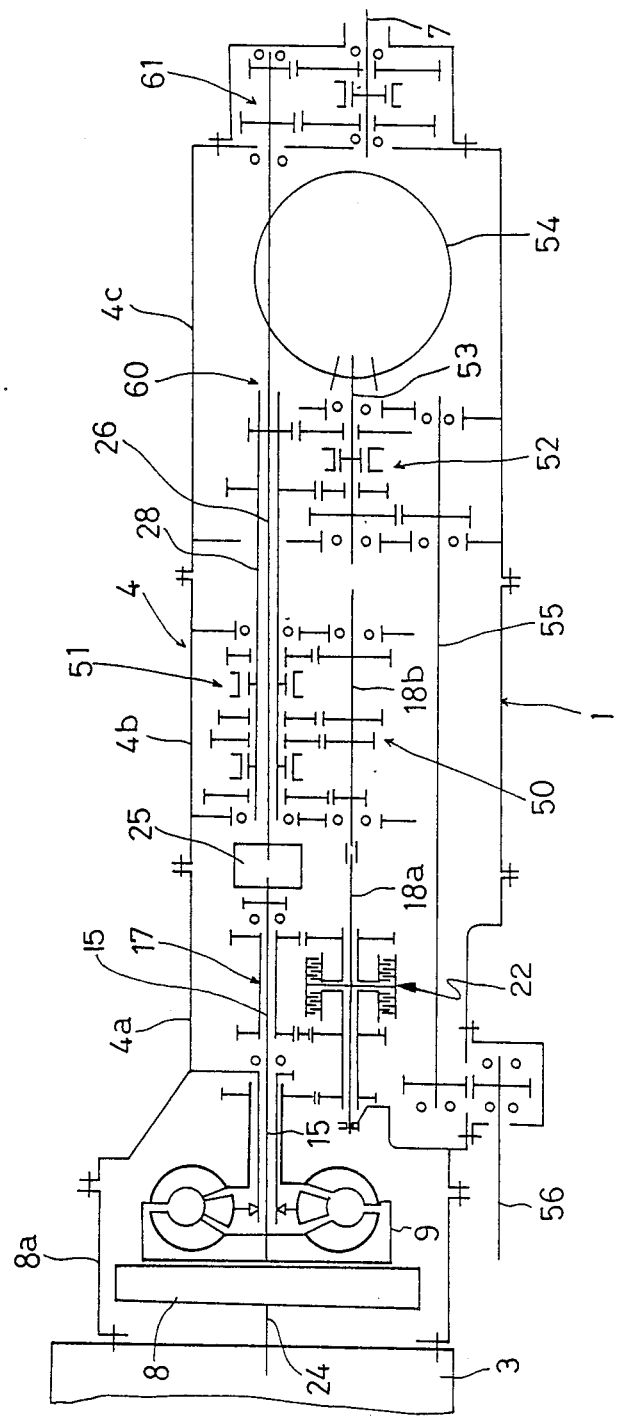
FIG. 2 is a schematic view illustrating one example of the transmission.

As shown in FIG. 2, the transmission case 4 consists of a front case 4a, an intermediate case 4b and a rear case 4c separably secured to one another by bolts. A flywheel 8 is mounted in a flywheel housing 8a interposed between and bolted to the engine 3 and the front case 4a.

The transmission case 4 houses a propelling line 50 and a power takeoff line 60. The propelling line 50 transmits drive from the engine 3 to the rear wheels 2 through a clutch mechanism 22, a main change speed mechanism 51, an auxiliary change speed mechanism 52, a differential drive shaft 53 and a rear differential 54, and to the front wheels 1 through the differential drive shaft 53, a transmission shaft 55 and a front wheel drive shaft 56. The power takeoff line transmits the drive from the engine 3 to the power takeoff shaft 7 through a first power takeoff transmission shaft 15, a power takeoff hydraulic clutch 25, a second power takeoff transmission shaft 26 and a power takeoff change speed mechanism 61.

Figure 3A:
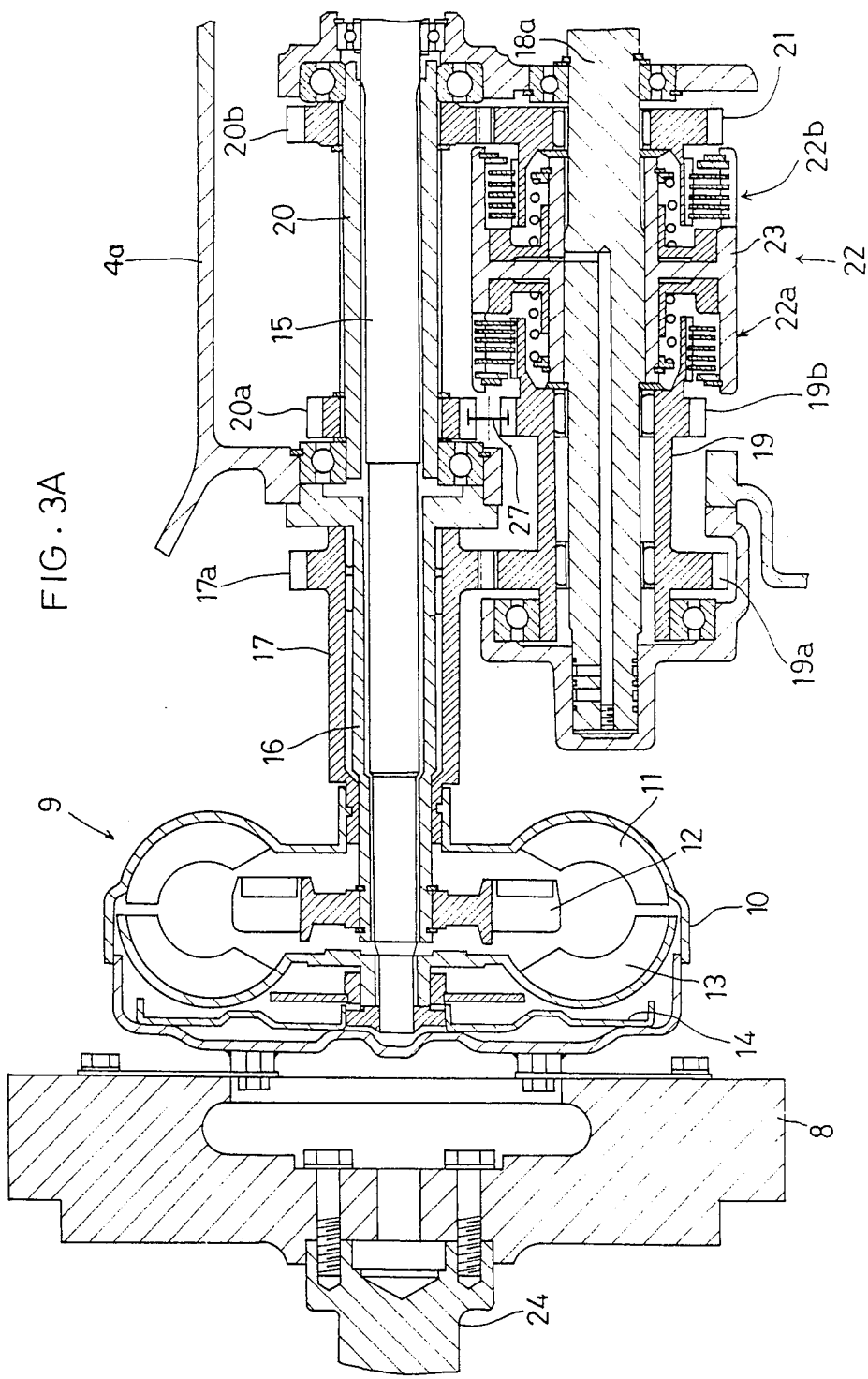
FIG. 3A is a side view illustrating the transmission of FIG. 2 and particularly a portion of the transmission including a torque convertor and adjacent elements.
Figure 3B:
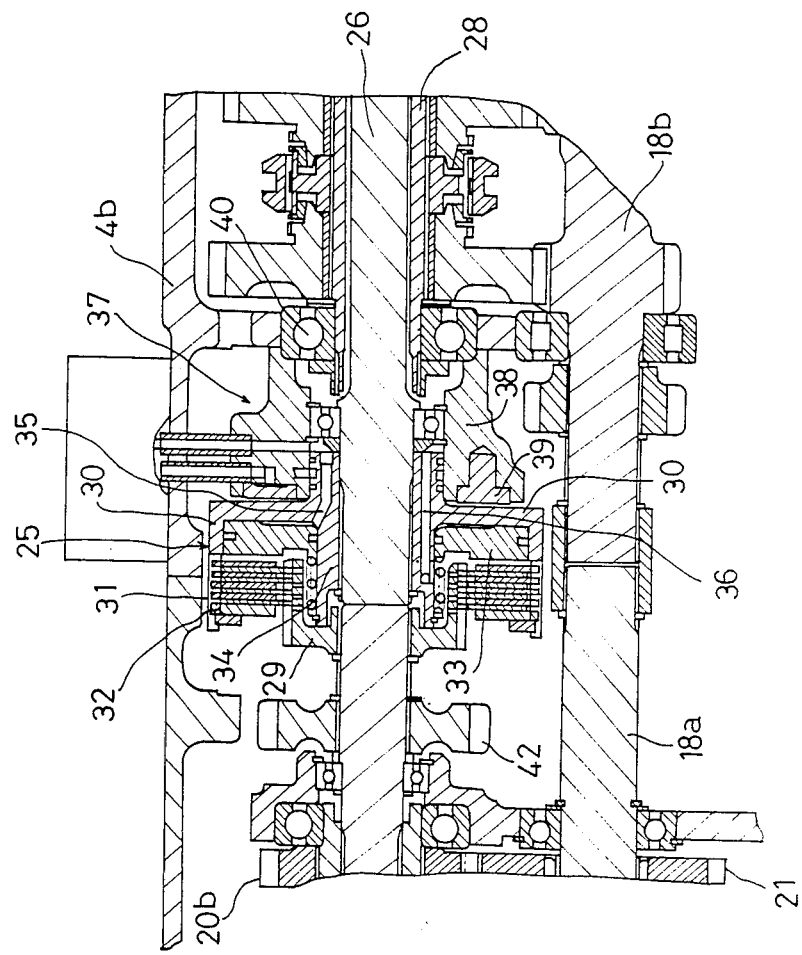
FIG. 3B is a side view of a protion of the transmission continuous from the portion shown in FIG. 3A.

Details of a region extending from the flywheel 8 to the power takeoff hydraulic clutch 25 are illustrated dividedly in FIGS. 3A and 3B. As seen in FIG. 3A, a torque converter 9 has a casing 10 fixed to the flywheel 8 which is directly connected to an output shaft 24 of the engine 3. This torque converter 9 comprises, in addition to the casing 10, a pump impeller 11, a stator 12, a turbine liner 13 and a lockup clutch 14.

The first power takeoff transmission shaft 15, which is connected to the second power takeoff transmission shaft 26 through the power takeoff clutch 25, has a front end projecting into a main portion of the torque converter 9. The turbine liner 13 and lockup clutch 14 are fixed to the forward end of the first power takeoff transmission shaft 15. The first power takeoff transmission shaft 15 is surrounded by a tubular support member 16 attached to the front case 4a and supporting the stator 12 through a one-way clutch (not shown). Further, a first output sleeve shaft 17 of the propelling line is relatively rotatably mounted on the tubular support member 16. The first output sleeve shaft 17 is fixed to the casing 10 of the torque converter 9 to be rotatable in unison therewith. Thus, the drive of the engine output shaft 24 is transmitted directly to the first output sleeve shaft 17 whereas the drive of the engine output shaft 24 is transmitted through the torque converter 9 to the first power takeoff transmission shaft 15.

The drive transmission through the propelling line will particularly be described hereinafter. A first propelling drive transmission shaft 18a is disposed parallel to the first power takeoff transmission shaft 15 for transmitting the drive to the main change speed mechanism 51 disposed downstream thereof. A second output sleeve shaft 19 is relatively rotatably mounted on the first propelling drive transmission shaft 18a. The second output sleeve shaft 19 carries a first gear 19a meshed with a gear 17a provided on the first output sleeve shaft 17. Furthermore, a third output sleeve shaft 20 is relatively rotatably mounted on the first power takeoff shaft 15. The third output sleeve shaft 20 carries a first gear 20a at a front end and a second gear 20b at a rear end thereof. The first gear 20a is meshed through a reverse gear 27 with a second gear 19b on the second output sleeve shaft 19, and the second gear 20b is meshed with a transmission gear 21 relatively rotatably mounted on the first propelling drive transmission shaft 18a. A first hydraulic clutch 22a is provided between the second gear 19b on the second output sleeve shaft 19 and the first propelling drive transmission shaft 18a, and a second hydraulic clutch 22b is provided between the transmission gear 21 and the first propelling drive transmission shaft 18a. The first and second hydraulic clutches 22a and 22b are formed integral with each other having a common disk 23 therebetween, and are together referred to herein as the clutch mechanism 22.

When the first hydraulic clutch 22a is engaged, the drive of the engine 3 is transmitted in forward rotation to the first propelling drive transmission shaft 18a through the casing 10 of torque converter 9, the first output sleeve shaft 17, the second output sleeve shaft 19 and the first hydraulic clutch 22a, whereby the tractor is driven forward. Conversely, when the second hydraulic clutch 22b is engaged, the drive is transmitted in backward rotation to the first propelling drive transmission shaft 18a through the casing 10 of torque converter 9, the first output sleeve shaft 17, the second output sleeve shaft 19, the reverse gear 27, the third output sleeve shaft 20, the transmission gear 21 and the second hydraulic clutch 22b, whereby the tractor is driven backward. When both the first and second hydraulic clutches 22a and 22b are disengaged, the drive is not transmitted to the propelling line downstream thereof. In other words, the clutch mechanism 22 acts as a main clutch in the propelling line while performing a backward and forward drive switching function.

The second power takeoff transmission shaft 26 is disposed rearwardly of and coaxial with the first power takeoff transmission shaft 15, and is surrounded by a tubular, third propelling drive transmission shaft shaft 28. As shown in FIG. 3B, the power takeoff hydraulic clutch 25 comprises a driving boss 29 splined to a rear end of the first power takeoff transmission shaft 15, a driven clutch case 30 splined to a front end of the second power takeoff transmission shaft 26, disks 31 mounted between the driving boss 29 and the clutch case 30, and a support plate 32 and a piston 33 attached to or mounted in the clutch case 30 for axially pressing upon the disks 31. The clutch case 30 includes a boss portion 34 defining an oil passage 35 for actuating the piston 33 and an oil passage 36 for supplying cooling oil to the disks 31.

Number 37 denotes a brake for braking the hydraulic clutch 25. The brake 37 comprises a brake case 38 and a piston 39 mounted in the brake case 38 to press lightly upon the clutch case 30. The brake case 38 is bolted to a partition wall of the transmission case 4 so as to hold in position a bearing 40 supporting the third propelling drive transmission shaft 28.

Figure 4:
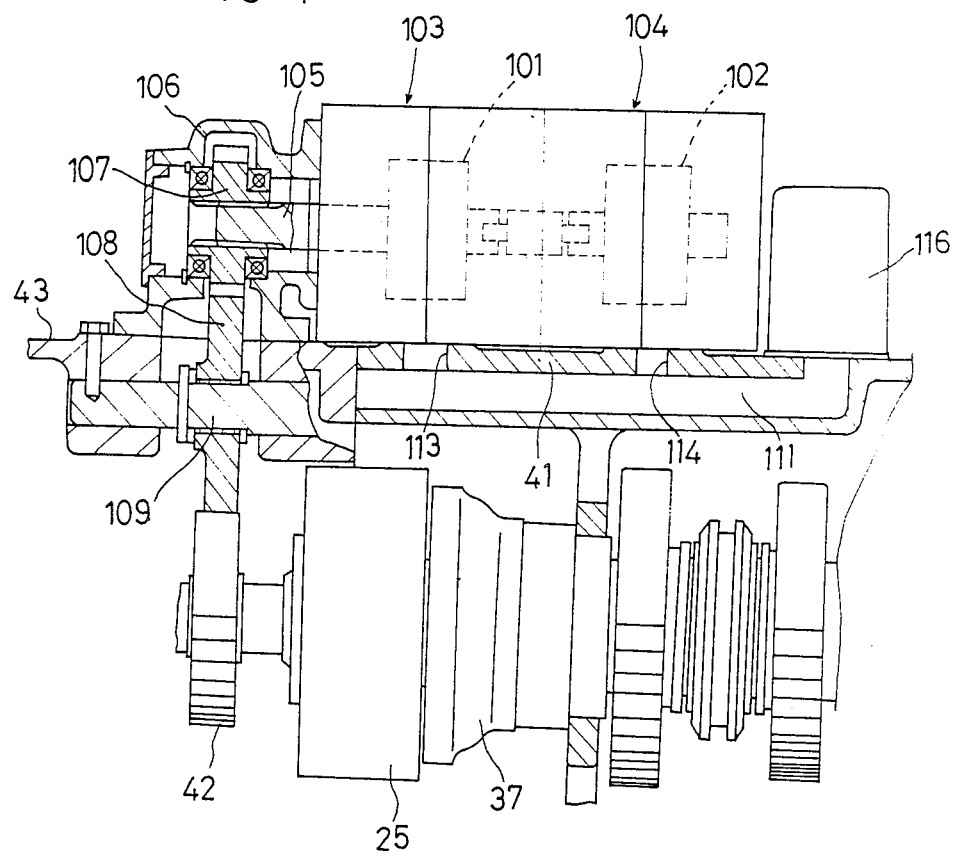
FIG. 4 is sectional plan view of a portion of the transmission adjacent hydraulic pumps.

As shown in FIG. 4, the intermediate case 4b of transmission case 4 includes a lateral wall 41 having a first hydraulic pump 103 and a second hydraulic pump 104 attached to an outer face thereof in series, the hydraulic pumps 103 and 104 housing pump gears 101 and 102, respectively. The hydraulic pumps 103 and 104 have a drive shaft 105 splined to a gear 107 mounted in a gear case 106. The gear 107 is meshed through an intermediate gear 108 with a power takeoff gear 42 on the first power takeoff transmission shaft 15. The power takeoff gear 42 is disposed on the first power takeoff transmission shaft 15 between the torque converter 9 and the power takeoff hydraulic clutch 25. The gear case 106 is attached to a lateral wall 43 of the front case 4a, and the intermediate gear 108 is relatively rotatably mounted on a support shaft 109 attached to the lateral wall 43 of the front case 4a.

Figure 5:
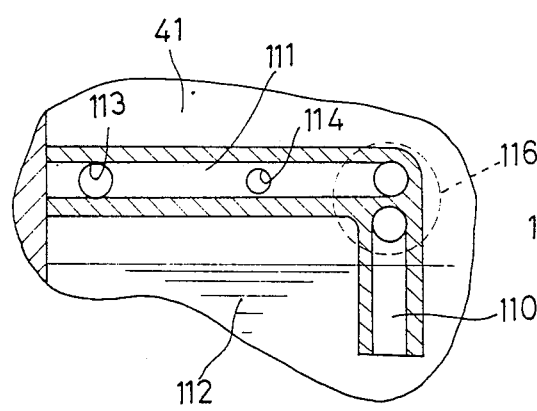
FIG. 5 is a sectional side view of intake passages of the hydraulic pumps.
Figure 6:
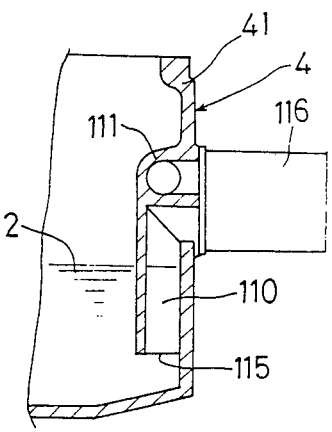
FIG. 6 is a sectional rear view of the intake passages.

As shown in FIGS. 5 and 6, the hydraulic pumps 103 and 104 draw oil 112 in the transmission case 4 through intake passages 110 and 111. The first hydraulic pump 103 supplies the oil to a hydraulic device at the rear end of the tractor for raising and lowering the working implement, while the second hydraulic pump 104 supplies the oil to the first and second hydraulic clutches 22a and 22b and to the power takeoff hydraulic clutch 25. The intake passage 111 is defined in the lateral wall 41 of the intermediate case 4b to extend longitudinally of the tractor and substantially in level with the hydraulic pumps 103 and 104. The intake passage 111 communicates with intake ports of the hydraulic pumps 103 and 104 through openings 113 and 114, respectively. The intake passage 110 is defined in the lateral wall 41 to extend downwardly from a rear end of the intake passage 111, with an opening 115 at a lower end thereof immersed in the oil 112. An oil filter 116 is attached to the outer face of the lateral wall 41 at a junction between the intake passages 110 and 111. The intake passage 110 communicates with an inlet of the oil filter 116, and the intake passage 111 with an outlet of the oil filter 116.

According to the above construction, when the engine 3 is operated, the drive is transmitted through the engine output shaft 24 to the first power takeoff transmission shaft 15, whereby the latter rotates at an even speed because of the presence of the flywheel 8. Consequently, the hydraulic pumps 103 and 104 are driven smoothly through the gear 42 on the first power takeoff transmission shaft 15, the intermediate gear 108 and the gear 107.

Then the hydraulic pumps 103 and 104 draw the oil 112 in the transmission case 4 through the intake passages 110 and 111, and supply the oil to the respective elements as described hereinbefore. Iron powder and the like present in the oil 112 are removed by the oil filter 116. Since the hydraulic pumps 103 and 104 are attached to the lateral wall 41 of the transmission case 4 and draw the oil 112 in its interior, the intake passages 110 and 111 may have a small length which greatly reduces suction resistance for the hydraulic pumps 103 and 104. Moreover, since the intake passages 110 and 111 are defined in the lateral wall 41, this construction requires no pipings for oil intake purposes. When an interior inspection is carried out by separating the transmission case 4 from the engine 3 and flywheel 8, the disassebly is readily effected since the hydraulic pumps 103 and 104 are attached to the intermediate case 4b of transmission case 4. When the intermediate case 4b is separated from the front case 4a, the drive shaft 105 of the hydraulic pumps 103 and 104 may just be withdrawn from the gear 107 in the gear case 106. Therefore, in either case the hydraulic pumps 103 and 104 need not be removed from the intermediate case 4b.

Figure 7:
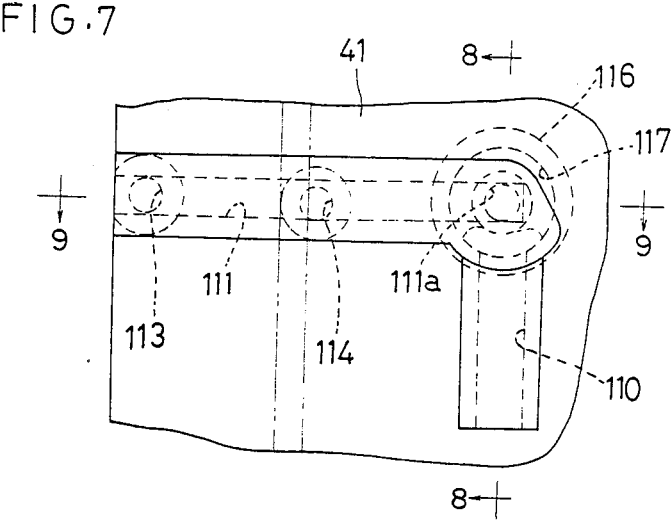
FIG. 7 is a side view of modified intake passages.
Figure 8:
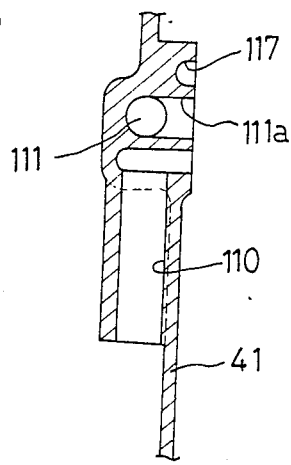
FIG. 8 is a sectional view taken on line 8—8 of FIG. 7.
Figure 9:
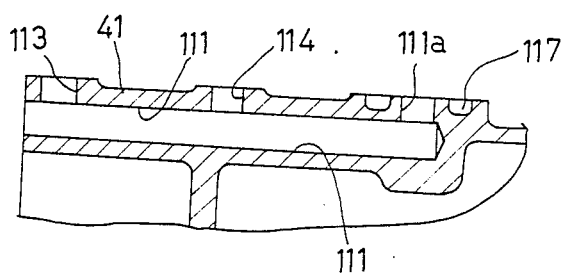
FIG. 9 is a sectional view taken on line 9—9 of FIG. 7.

The oil filter may be connected to the intake passages 110 and 111 as shown in FIGS. 7 through 9. In this modification, the intake passage 111 has an opening 111a centrally of the connection, which is surrounded by an annular passage 117 through which the intake passage 110 and the oil filter 116 communicate with each other.

Furthermore, the hydraulic pumps 103 and 104 may be mounted inside the transmission case 4.

As noted above, the present invention wherein the hydraulic pumps are attached to the lateral wall of the transmission case and the intake passages are defined in the lateral wall, dispenses with intake pipings and thereby simplifies the construction. Since the hydraulic pumps are attached to the transmission case, the intake passages may have a small length which is effective to reduce the suction resistance for the hydraulic pumps thereby enabling an efficient intake operation.

What is claimed is:

1. A transmission comprising:
a torque converter,
said torque converter including a casing directly connected to a power output of an engine for providing a power input for said torque converter, a stator fixed to a stationary portion of said transmission, and a turbine liner functioning as an output portion of said torque converter;
a propelling transmission mechanism,
said propelling transmission mechanism having an input shaft secured to said torque converter casing and to said engine output; and
a power take-off transmission mechanism,
said power take-off transmission mechanism including an input shaft connected to said torque converter liner.

2. A transmission as set forth in claim 1, wherein:
said input shaft of said propelling transmission mechanism is constructed of a tubular shaft that surrounds said input shaft of said power take-off transmission mechanism.

3. A transmission as set forth in claim 2, wherein:
said stationary portion of said transmission is of a tubular construction and disposed between said input shaft of said propelling transmission mechanism and said input shaft of said power take-off transmission mechanism.

4. A transmission as set forth in claim 1, wherein:
said propelling transmission mechanism includes clutch means,
said clutch means having a first hydraulic clutch for transmitting the engine output in forward rotation and a second hydraulic clutch for transmitting the engine output in backward rotation; and
said engine output through said propelling transmission mechanism is inactivated when said first and second clutches are disengaged.

5. A transmission as claimed in claim 1, wherein:
said power take-off transmission mechanism includes a hydraulic power take-off clutch.

6. A transmission as claimed in claim 5, wherein:
said power take-off transmission mechanism includes a power take-off gear between said torque converter and said hydraulic power take-off clutch for actuating at least one hydraulic pump.

7. A transmission as set forth in claim 1, which includes:
a lock-up clutch within said torque converter secured to said power take-off shaft.

* * * * *